(12) United States Patent
Malmberg et al.

(10) Patent No.: US 6,354,196 B1
(45) Date of Patent: Mar. 12, 2002

(54) APPARATUS FOR GAS TREATMENT OF PRODUCTS

(75) Inventors: Jonny Malmberg; Per Blixt, both of Helsingborg (SE); Jon A Hocker, Kirkland; Rick Wilson, Kent, both of WA (US)

(73) Assignee: Frigoscandia Equipment A/S, HelsingBorg (SE)

(*) Notice: Subject to any disclaimer, the term of this patent is extended or adjusted under 35 U.S.C. 154(b) by 0 days.

(21) Appl. No.: 09/889,672

(22) PCT Filed: Jan. 20, 2000

(86) PCT No.: PCT/SE00/00110

§ 371 Date: Jul. 19, 2001

§ 102(e) Date: Jul. 19, 2001

(87) PCT Pub. No.: WO00/42869

PCT Pub. Date: Jul. 27, 2000

(30) Foreign Application Priority Data

Jan. 20, 1999 (SE) ................................................ 9900166

(51) Int. Cl.[7] .............................. A23L 1/00; A23L 1/01; A23L 3/36; F25D 3/11; F25D 23/02
(52) U.S. Cl. ........................ 99/443 C; 99/386; 99/476; 99/477; 126/21 A
(58) Field of Search .............................. 99/386, 443 R, 99/443 C, 476, 477–479; 126/21 A; 219/388, 400

(56) References Cited

U.S. PATENT DOCUMENTS

| | | | | |
|---|---|---|---|---|
| 1,817,875 A | * | 8/1931 | Broadbent | ................... 99/476 |
| 3,813,895 A | | 6/1974 | Klee et al. | |
| 3,908,533 A | * | 9/1975 | Fagerstrom | ............... 99/443 C |
| 3,991,737 A | * | 11/1976 | Del Fabbro | ............... 126/21 A |
| 4,368,664 A | * | 1/1983 | Smith | ........................ 99/443 C |
| 4,478,141 A | * | 10/1984 | Svensson | ..................... 99/474 |
| 4,576,090 A | * | 3/1986 | Burtea | ...................... 99/443 C |
| 4,679,542 A | | 7/1987 | Smith et al. | |
| 4,779,524 A | * | 10/1988 | Wade | ........................... 99/476 |
| 4,831,238 A | * | 5/1989 | Smith | ......................... 219/388 |
| 4,873,107 A | * | 10/1989 | Archer | .......................... 99/477 |
| 4,909,430 A | * | 3/1990 | Yokota | ........................ 219/388 |
| 4,951,648 A | * | 8/1990 | Shukla | ..................... 99/443 C |
| 4,986,174 A | * | 1/1991 | Gongwer | .................. 99/386 X |
| 5,231,920 A | * | 8/1993 | Alden | ........................... 99/475 |
| 5,408,921 A | | 4/1995 | Persson et al. | |

FOREIGN PATENT DOCUMENTS

EP 0 249 323 A1 12/1987

* cited by examiner

Primary Examiner—Timothy F. Simone
(74) Attorney, Agent, or Firm—Browdy and Neimark

(57) ABSTRACT

An apparatus for gas treatment of products rises a housing having top, bottom and side walls; a conveyor belt for transporting the products along a first path in the housing; a tunnel having perforated walls and enclosing the conveyor belt along the first path; a gas circulation device communicating with the tunnel via the perforated walls for circulating gas into the tunnel in the form of gas jets impinging upon the products carried by the conveyor belt, and out of the tunnel in a return channel back to the gas circulation device; and a gas conditioning device positioned in the return channel. At least one substantially vertical part of the connecting walls of the high-pressure chamber is removable so as to provide access to the inside of the pressure chamber, and at least one of the side walls of the housing along the high-pressure chamber may be movable so as to widen the space between at least one wall and the high-pressure chamber.

16 Claims, 2 Drawing Sheets

APPARATUS FOR GAS TREATMENT OF PRODUCTS

The present application is the national stage under 35 U.S.C. 371 of international application PCT/SE00/00110, filed Jan. 20, 2000, which designated the United States, and which international application was published under PCT Article 21(2) in the English language.

BACKGROUND OF THE INVENTION

The present invention is related to gas treatment of products, specifically food and similar products, using gas jets which impinge upon the products for e.g. cooling, heating or drying them.

Devices for cooling or heating food products are known from e.g. U.S. Pat. No. 4,679,542 to Donald P. Smith et al. These devices comprise a housing in which a high-pressure gas plenum communicates with upper and lower ducts defining a treatment area therebetween and having a plurality of nozzles for ejecting gas jets vertically into the treatment area. The food products to be treated are supported by a conveyor belt that transports them through the treatment area.

The design of these known devices is quite complex, resulting in difficulties in meeting the high hygienic requirements of the food industry. Also, the maintenance of the prior art devices is time-consuming, and the intervals between successive shutdowns are short.

Another apparatus for cooling, heating or drying of products is known from U.S. Pat. No. 5,408,921 to Per-Oskar Persson et al. This apparatus comprises a housing and a conveyor belt for transporting the products through the housing along a path from an inlet opening to an outlet opening in the housing. A tunnel encloses the conveyor belt at least along a part of the path from the inlet opening to the outlet opening. Cold air is circulated by fan means through perforations in the tunnel walls opposite to the products carried on the conveyor belt such that air jets impinge upon the surface of the products, and further out of the tunnel to air conditioning means for conditioning the air and then back to the outside of the tunnel.

This prior art apparatus substantially eliminates or at least reduces the above-noted problems of the devices known from e.g. U.S. Pat. No. 4,679,542 to Donald P. Smith et al.

However, the known devices and apparatus are relatively bulky.

SUMMARY OF THE INVENTION

Therefore, one object of the present invention is to provide a compact apparatus for gas treatment of products.

Another object of the present invention is to provide such an apparatus which meets the high hygienic requirements of the food industry.

According to the present invention these objects are attained by an apparatus for gas treatment of products which a housing having top, bottom and side-walls; a conveyor belt for transporting the products along a first path in the housing; a tunnel having perforated walls and enclosing the conveyor belt along the first path; gas circulation means communicating with the tunnel via the perforated walls for circulating gas into the tunnel in the form of gas jets impinging upon the products carried by the conveyor belt, and out of the tunnel in a return channel back to the gas circulation means, and gas conditioning means positioned in the return channel for conditioning the gas circulated by the gas circulation means. Further, walls connecting with the perforated walls of the tunnel and having an opening towards the gas circulation means, form a high-pressure chamber substantially above the tunnel and spaced from the walls of the housing. Finally, at least one substantially vertical part of the connecting walls of the high-pressure chamber is removable so as to provide access to the inside of the pressure chamber.

By this configuration, a compact design is obtained which also provides easy access to all parts of the apparatus, which is a condition for fulfilling the high hygienic requirements of the food industry.

Preferably, at least one substantially vertical part of the connecting walls of the high-pressure chamber is slidable or articulated for providing an access opening into the high-pressure chamber.

In a preferred embodiment, the vertical parts of the connecting walls on both sides of and all along the tunnel in the high-pressure chamber are removable.

Further, the conveyor belt is preferably foraminous, the top wall of the tunnel being perforated substantially over its whole area, and the bottom wall of the tunnel having perforated sections extending transversely of the first path, such that the gas jets may impinge upon both the top side and the bottom side of the products on the, conveyor belt.

In a most preferred embodiment, at least one of the side walls of the housing along the high-pressure chamber is removable so as to widen the space between said at least one wall and the high-pressure chamber. This results in a very compact configuration, still fulfilling high demands on access to all parts of the apparatus.

DESCRIPTION OF THE PREFERRED EMBODIMENTS

Figure 1:
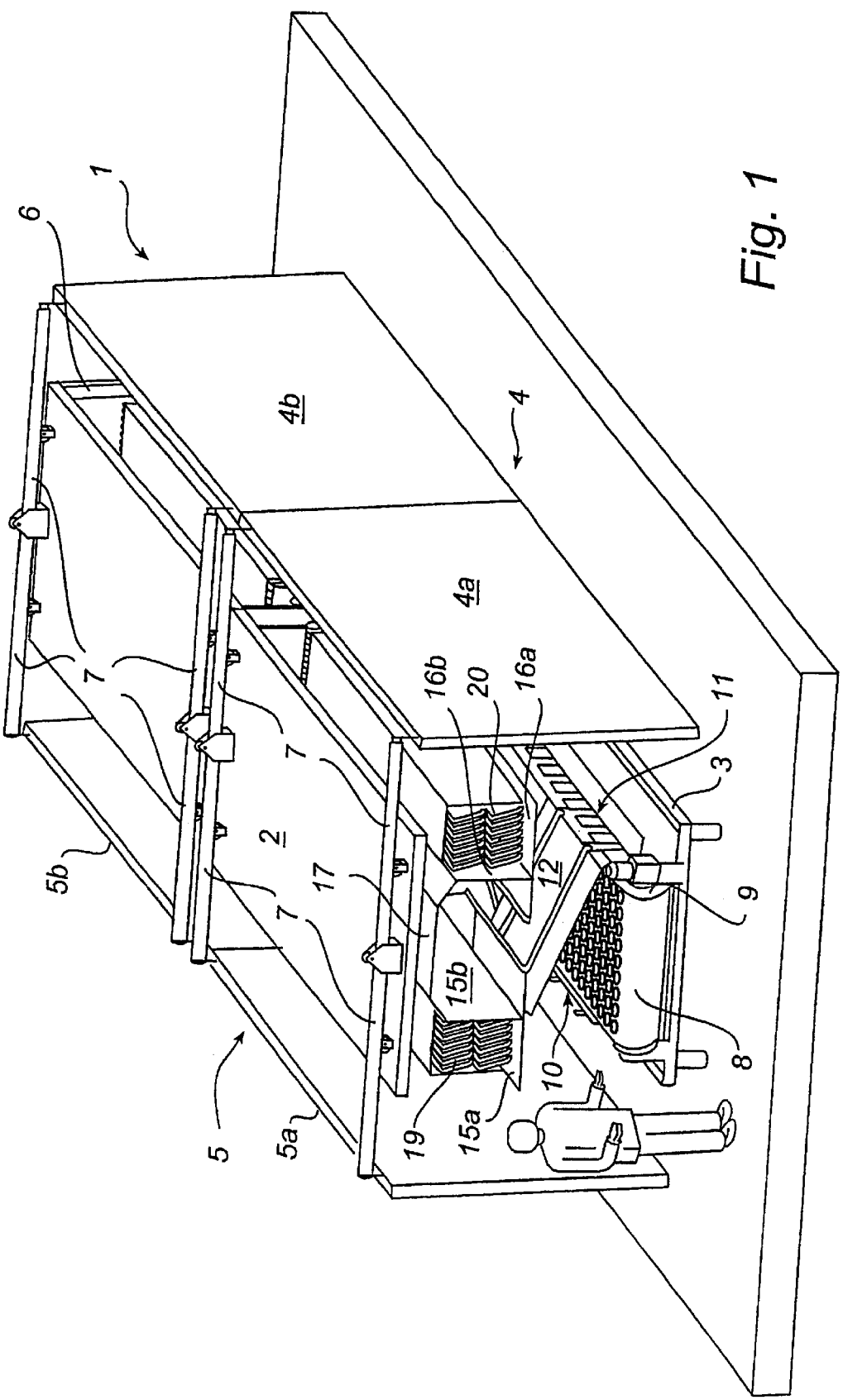
FIG. 1 is a perspective view of a first embodiment of an apparatus according to the present invention.
Figure 2:
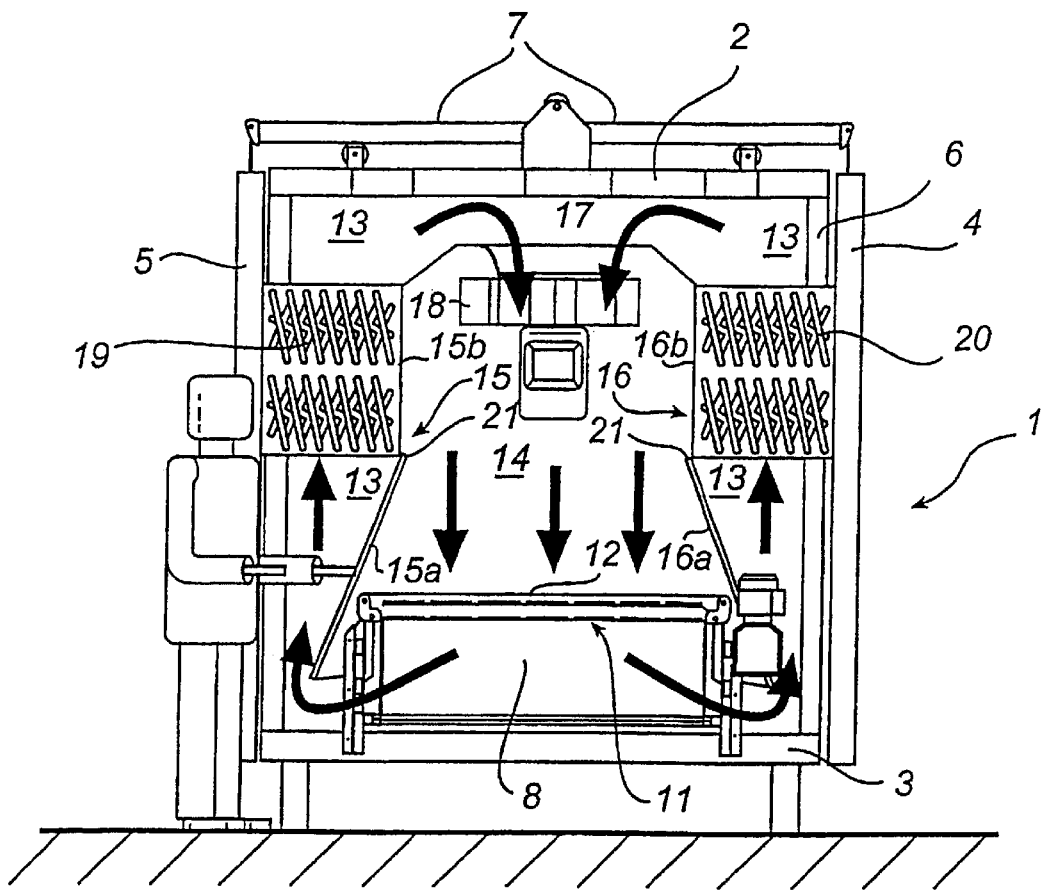
FIG. 2 is a cross-sectional view of the apparatus in FIG. 1.

Referring to FIGS. 1 and 2, an apparatus for quick freezing of food products, e.g. meat patties, comprises a housing 1 having a top wall 2, a bottom wall 3, two side walls 4 and 5, and two end walls (not shown). The top wall is supported on a stand 6. Each one of the side walls 4, 5 has two sections 4a, 4b and 5a, 5b, respectively. Each one of these wall sections 4a, 4b, 5a, 5b is removable by being supported on two telescopic arms 7 which are mounted on top of the top wall 2.

The side walls 4 and 5 are shown in ejected or open positions in FIG. 1 and in retracted or closed positions in FIG. 2. Obviously, removing. one or both of the side walls 4 and 5 by pulling them from their closed positions to their open positions gives very good access to the equipment inside the housing 1. On the other hand, the apparatus is very compact when the side walls 4 and 5 are pushed back into their closed positions, as illustrated in FIG. 2.

The equipment within the housing 1 comprises a conveyor belt 8 extending between a first end roller 9 at one end of the housing 1 and a second end roller (not shown) at the other end of the housing 1. The conveyor belt 8 follows a first upper path 10 between the end rollers for transporting products to be frozen through the housing 1 from an infeed opening in one end wall to an outfeed opening in the opposite end wall.

A tunnel 11 encloses the conveyor belt 8 along the first path. This tunnel 11 has substantially the same configuration as the tunnel disclosed in U.S. Pat. No. 5,408,921 which is incorporated herein by reference. Thus the tunnel 11 comprises a top wall 12 which is perforated substantially over its whole area, and a bottom wall (not shown) which has perforated sections extending transversely of the first path. Further, the bottom wall of the tunnel has a plurality of openings alternating with said perforated sections and communicating with a return channel 13.

A high-pressure chamber 14 is provided by substantially vertical side walls 15 and 16 each one connecting with the side edges of the openings of the bottom wall of the tunnel 11, and a top wall 17 having an opening towards a fan 18 constituting a gas circulation means. This high-pressure chamber 14 is positioned substantially above the tunnel 11 and is spaced from the side walls 4, 5 of the housing 1.

The return channel 13 leads from under the tunnel 11 laterally to the outside of the side walls 15, 16 of the high-pressure chamber 14 up through an evaporator 19, 20 and then laterally inwards above the top wall 17 of the high-pressure chamber 14 towards the center of the housing 1 and the suction side of the fan 18.

The lower parts 15a, 16a of the side walls 15, 16 of the high-pressure chamber 14 are articulated to the top parts 5b, 16b of the same side walls 15, 16, e.g. by axes 21. In their closed position, as illustrated in FIG. 2, the lower parts 15a, 16a of the side walls 15, 16 keep the high-pressure chamber 14 closed such that air introduced by the fan 18 can generate a high pressure in the chamber 14 and thereby also generate air jets through the perforations of the upper (12) and lower walls of the tunnel 11 impinging upon the products carried by the conveyor belt 8 therein. The lower parts 15a, 16a of the side walls 15, 16 are substantially horizontal in their open position, i.e. being swung outwards from the tunnel 11, and now give access to the inside of the high-pressure chamber 14.

In operation, the apparatus is as illustrated in FIG. 2, i.e. the side walls 4, 5 of the housing 1 are in their closed positions and the lower parts 15a, 16a of the side-walls 15, 16 of the high-pressure chamber 14 are in their lower positions closing the high-pressure chamber 14. The fan 18 then blows air into the high-pressure chamber 14 thereby generating air jets from the perforations of the tunnel 11 impinging upon the objects on the conveyor belt 9 therein. The air exits from the tunnel through its bottom openings and flows laterally outwards above the bottom wall 3 and upwards in the channel 13 between the side wall 4 of the housing 1 and the side wall 16 of the high-pressure chamber 14 to the evaporator 20, and also in the channel 13 between the side wall 5 of the housing 1 and the side wall 15 of the high-pressure chamber 14 to the evaporator 19. From the evaporators 19, 20 the cold air is sucked through the remaining parts of the channel 13 into the suction side of the fan 18.

As a consequence of the central position of the high-pressure chamber 14 in the housing 1, the pressure on the inside of the walls 2–5 of the housing 1 does not differ very much from the ambient. pressure outside the housing so that there is substantially no tendency for air leakage between inside and outside of the housing 1.

When shutting down the apparatus, the walls 4 and 5 are pulled out to their open positions, the lower parts 15a, 16a of the side walls 15, 16 of the high-pressure chamber 14 are swung upwards to their open positions, and the top wall 12 of the tunnel 11 may also be swung up or tilted to an open position, as shown in FIG. 1. Thereby, all components of the apparatus are easily accessible for cleaning.

Figure 3:
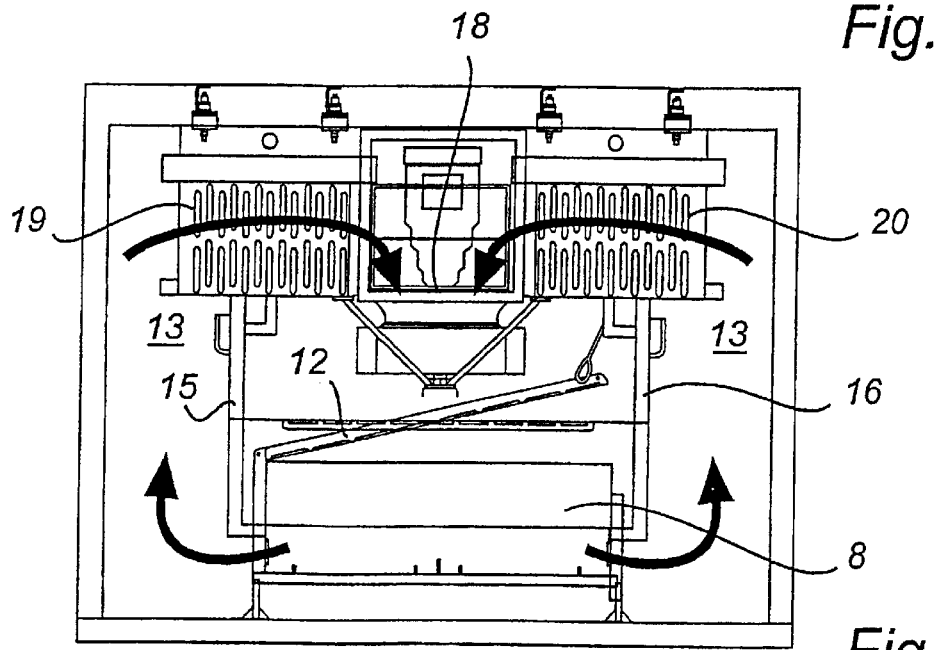
FIG. 3 is a cross-sectional view corresponding to that in FIG. 2 illustrating a second embodiment of an apparatus according to the present invention.

Referring to FIG. 3, the second embodiment of an apparatus according to the present invention differs from the first embodiment in that the side walls 15 and 16 of the high-pressure chamber 14 are lids that are slidable lengthwise, i.e. parallel to the transportation direction of the conveyor belt 9. Further, the evaporators 19 and of the second embodiment are positioned substantially above the high-pressure chamber 14, thereby expanding the available space in front of the side walls 15, 16, such that movable side-walls of the housing are not necessary.

It is to be understood that modifications, alterations, and changes can be made in the above-described embodiments of the apparatus without departing from the scope of the invention as claimed herein. Thus, normally the gas is air but it may consist of other gases as well. Where the apparatus is used for freezing food products, the conditioning means may consist of a cooling battery, such as the exemplified evaporator. When the apparatus is used for heating food products, the conditioning means may consist of a heat exchanger or an electrical heater, Finally, where the apparatus is used for drying food products, the conditioning means may consist of a moisture regulating device. Other conditioning means are also possible.

What is claimed is:

1. An apparatus for gas treatment of products, comprising
a housing (1) having top, bottom and side walls (2; 3; 4, 5),
a conveyor belt (8) for transporting the products along a first path (10) in the housing (1),
a tunnel (11) having perforated walls (12) and enclosing the conveyor belt (8) along the first path (10),
gas circulation means (18) communicating with the tunnel (11) via the perforated walls (12) for circulating gas into the tunnel (11) in the form of gas jets impinging upon the products carried by the conveyor belt (8), and out of the tunnel (11) in a return channel (13) back to the gas circulation means (18), and
gas-conditioning means (19, 20) positioned in the return channel (13) for conditioning the gas circulated by the gas circulation means (18),
characterised by walls (15–17) being separated from the walls (2–5) of the housing (1), said separated walls (15–17) being connected with the perforated walls (12) of the tunnel (11) and having an opening towards and connected to an outlet of the gas. circulation means (18) in order to form a high pressure chamber (14) substantially above the tunnel (11) and constituting a gas circulation channel from said outlet of the gas circulation means (18) to the perforated walls (12) of the tunnel (11),
at least one substantially vertical part of the walls (15–17) forming the high-pressure chamber (14) being removable so as to provide access to the inside of the high-pressure chamber (14).

2. An apparatus for gas treatment of products as claimed in claim 1, wherein said at least one substantially vertical part of the walls (15–17) forming the high-pressure chamber (14) is slidable for providing an access opening into the high-pressure chamber (14).

3. An apparatus for gas treatment of products as claimed in claim 1, wherein said at least one substantially vertical part of the walls (15–17) forming the high-pressure chamber (14) is articulated for providing an access opening into the hihg-pressure chamber (14).

4. An apparutus for gas treatment of products as claimed in any one of claims 1–3, wherein the vertical parts of the walls (15–17) forming the high-pressure chamber (14) are removable all along the tunnel (11).

5. An apparatus for gas treatment of products as claimed in 4, wherein substantially vertical parts of the walls (15–17) forming the high-pressure channel (14) of the removable on both sides of the tunnel (11).

6. An apparatus for gas treatment of products as claimed in claim 1, wherein the high-pressure chamber (14) has a top wall (17) positioned above the tunnel (11) and supporting the gas circulation means (18).

7. An apparatus for gas treatment of products as claimed in claim 1, wherein the conveyor belt (8) is foraminous, a top wall (12) of the tunnel (11) is perforated substantially over its whole area, and a bottom wall of the tunnel (11) has perforated sections extending transversely of the first path (10).

8. An apparatus for gas treatment of products as claimed in 7, wherein the bottom wall of the tunnel (11) has a plurality of openings alternating with said perforated sections and communicating with the return channel (13).

9. An apparatus for gas treatment of products as claimed in claim 1, wherein at least one of the side walls (4, 5) of the housing (1) along the high-pressure chamber (14) is removable so as to widen the space between said at least one wall (4, 5) and the high-pressure chamber (14).

10. An apparatus for gas treatment of product as claimed in claim 9, wherein said side walls (4, 5) of the housing (1) comprises at least two adjoining sections (4a, 4b, 5a, 5b).

11. An apparatus for gas treatment of products as claimed in claim 9, wherein said removable side walls (4, 5) are depending from telescopic arms (7) mounted on the top wall (2) of the housing (1).

12. An apparatus for gas treatment of products as claimed in claim 6, wherein the conveyor belt (8) is foraminous, a top wall (12) of the tunnel (11) is perforated substantially over its whole area, and a bottom wall of the tunnel (11) has perforated sections extending transversely of the first path (10).

13. An apparatus for gas treatment of products as claimed in 12, wherein the bottom wall of the tunnel (11) has a plurality of openings alternating with said perforated sections and communicating with the return channel (13).

14. An apparatus for gas treatment of products as claimed in claim 13, wherein at least one of the side walls (4, 5) of the housing (1) along the high-pressure chamber (14) is removable so as to widen the space between said at least one wall (4, 5) and the high-pressure chamber (14).

15. An apparatus for gas treatment of products as claimed in claim 14, wherein said side walls (4, 5) of the housing (1) comprises at least two adjoining sections (4a, 4b 5a, 5b).

16. An apparatus for gas treatment of products as claimed in claim 15, wherein said removable side walls (4, 5) are depending from telescopic arms (7) mounted on the top wall (2) of the housing (1).

\* \* \* \* \*